Jan. 4, 1944.   W. M. MAKINO   2,338,251
COFFEE OR TEA POT
Filed Feb. 8, 1943   2 Sheets-Sheet 1
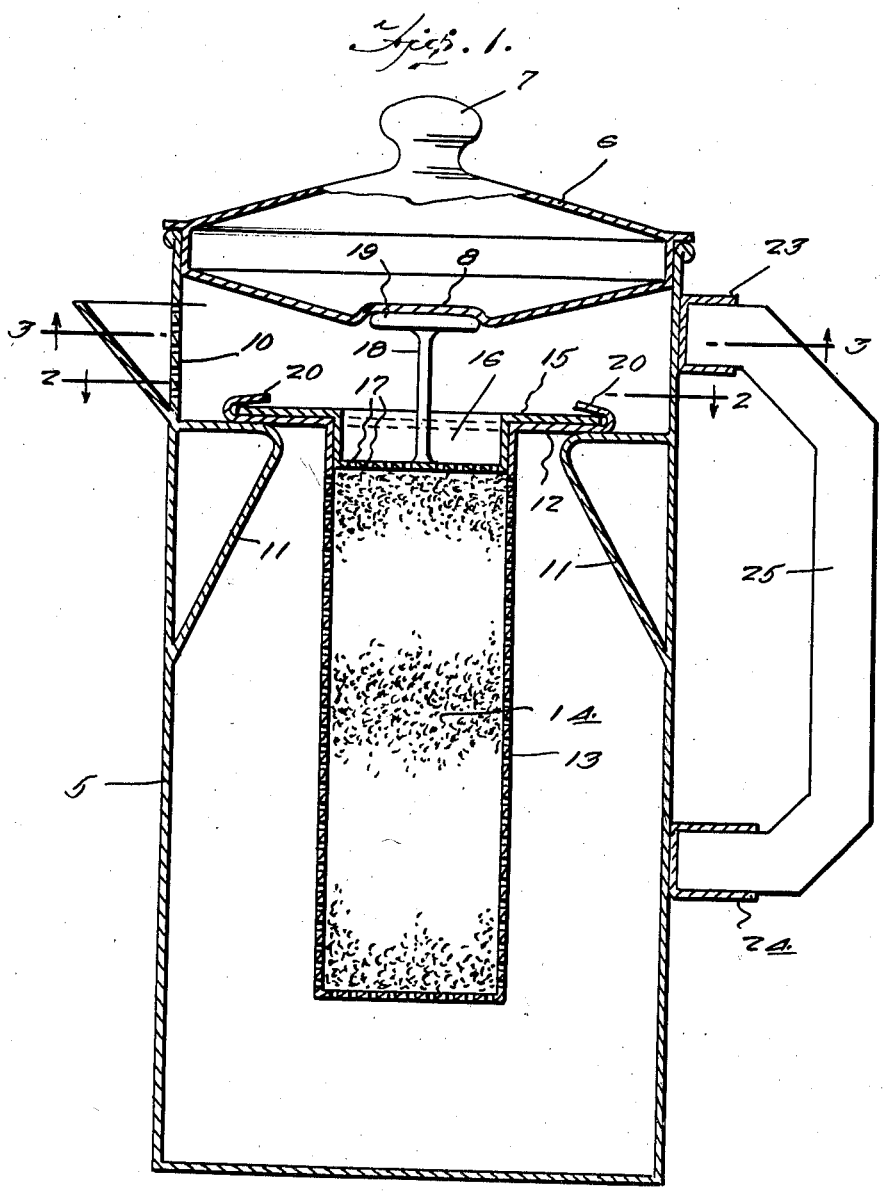
Inventor
William Megumu Makino
By Clarence A. O'Brien
and Harvey B. Jacobson
Attorneys Jan. 4, 1944. W. M. MAKINO 2,338,251
COFFEE OR TEA POT
Filed Feb. 8, 1943    2 Sheets-Sheet 2
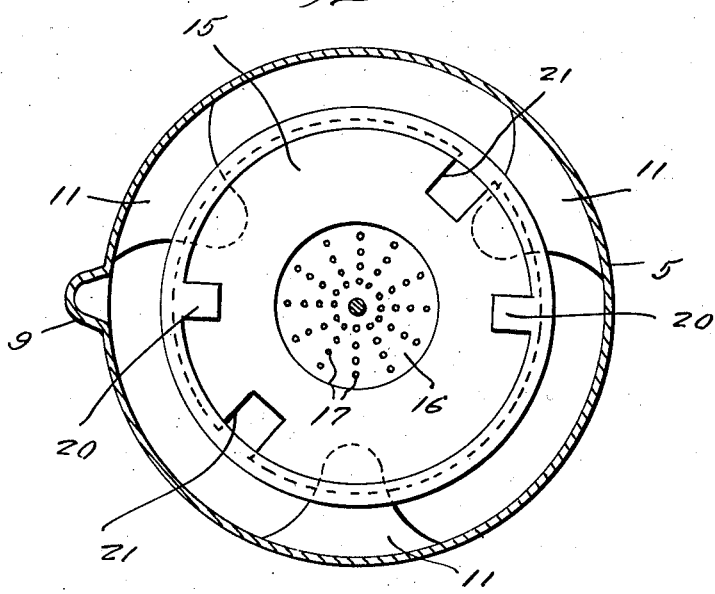
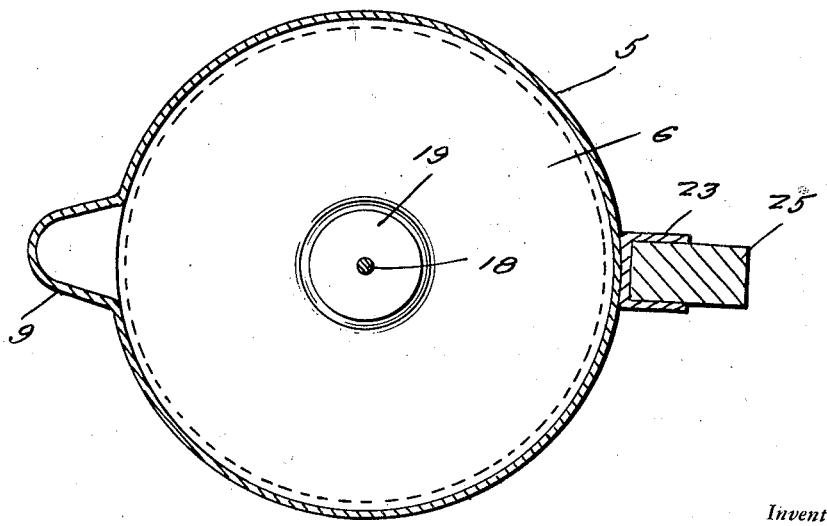
Inventor
William Megumu Makino
By Clarence A. O'Brien
and Harvey B. Jacobson
Attorneys Patented Jan. 4, 1944

2,338,251

UNITED STATES PATENT OFFICE 2,338,251

COFFEE OR TEA POT

William Megumu Makino, Stamford, Conn.

Application February 8, 1943, Serial No. 475,129

2 Claims. (Cl. 99—322)

This invention relates to new and useful improvements in pots wherein coffee or tea can be prepared.

The principal object of the present invention is to provide a pot of the character stated in which the material to be prepared is placed in such a manner that its residue will not escape with the prepared beverage when pouring the same from the pot.

Another important object of the invention is to provide a pot of the character stated in which more beverage can be prepared from an equivalent or smaller amount of material than is possible with present day pot constructions.

Other objects and advantages of the invention will become apparent to the reader of the following description.

In the drawings—

Figure 1 is a vertical sectional view through the improved pot.

Figure 2 is a section on the line 2—2 of Figure 1.

Figure 3 is a section on the line 3—3 of Figure 1.

Referring to the drawings wherein like numerals designate like parts, it can be seen that the structure includes a pot 5 which may be substantially of the shape shown in Figure 1 for preparing coffee, or somewhat flatter and broader for preparing tea.

The pot or receptacle 5 is open at its top, but provided with a slip type hollow top 6 having a handle or knob 7. The bottom of this top 6 is beveled as shown in Figure 1 and provided at its central portion with a depression 8.

Slightly down from the upper edge of the receptacle 5 is a pouring lip 9 inwardly of which is a strainer 10 for straining liquid while being poured to prevent the escape of residue.

Thus below the pouring lip 9, the inner side of the receptacle 5 is provided with several equally spaced protuberances 11, which of course define supports for the circumferential flange 12 at the upper end of a perforated container 13 in which material to be treated, and which is denoted by numeral 14, is placed.

A cap 15 is provided for the container 14 and this has a depressed portion 16 for snug disposition into the upper end of the container, this depressed portion 16 having its bottom formed with perforations 17. A stem 18 rises from the central portion of the bottom of the depressed portion 16 and has a seat-like portion 19 at its upper end bearing into the depression 8 of the cap 6.

The peripheral portion of the flange 12 (see Figure 1) is formed with inwardly disposed lugs 20, 20, which can be matched by notches 21, 21 formed in the peripheral portion of the cap 15.

Obviously, when the top 6 is removed, the seat-like portion 19 on the upper end of the stem 18 can be rotated in order to rotate the cap 15 and bring the notches 21, 21 into registration with the lugs 20, 20. Thus the cap 16 is freed from the container 13, but, of course, the container and the cap 15 can be first removed from the pot 5 before this separating operation.

The outside of the pot 5 is provided with upper and lower socket structures 23, 24 for the reception of the end portions of a substantially U-shaped handle 25.

Obviously, it is desirable to have the top 6 snugly fit within the upper portion of the pot 5 so that it will snugly engage the seat portion 19 of the stem 18 and hold the material container snugly in place on the supporting protuberances 11.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A beverage preparing pot comprising a receptacle, a top for the receptacle, a pouring spout at the side of the receptacle, supporting elements in the receptacle, a material container provided with a laterally disposed flange for rest on the supporting elements, and means interposed between the top and the container for holding the container on the supporting element, said means comprising a cap for the container and an element interposed between the cap and the top, said top having a depression in the bottom thereof, and a seat-like structure on the stem for disposition in the depression.

2. A beverage preparing pot comprising a receptacle, a top for the receptacle, a pouring spout at the side of the receptacle, supporting elements in the receptacle, a material container provided with a laterally disposed flange for rest on the supporting elements, and means interposed between the top and the container for holding the container on the supporting element, said means comprising a detachable cap for the container, said cap being provided with a depressed portion for snug disposition within the upper portion of the container, and a rod extending from the depressed portion of the cap to bear against the bottom side of the top.

WILLIAM MEGUMU MAKINO.